United States Patent
Yuasa

(10) Patent No.: US 8,630,791 B2
(45) Date of Patent: Jan. 14, 2014

(54) DYNAMIC ROUTE GUIDANCE

(75) Inventor: Go Yuasa, Racho Palos Verdes, CA (US)

(73) Assignee: Honda Motor Co., Ltd., Tokyo (JP)

( * ) Notice: Subject to any disclaimer, the term of this patent is extended or adjusted under 35 U.S.C. 154(b) by 300 days.

(21) Appl. No.: 13/040,814

(22) Filed: Mar. 4, 2011

(65) Prior Publication Data

US 2012/0226435 A1    Sep. 6, 2012

(51) Int. Cl.
G06F 19/00 (2011.01)
G06G 7/70 (2006.01)
G06G 7/76 (2006.01)

(52) U.S. Cl.
USPC ........... 701/123; 701/408; 701/410; 701/438; 701/527; 340/995.19; 340/995.24; 340/995.27; 73/114.52; 705/400

(58) Field of Classification Search
USPC ........... 701/23, 117–119, 123, 400, 408, 409, 701/410, 414, 438, 527, 532, 533; 340/450, 340/450.2, 995.1, 995.14, 995.17, 995.19, 340/995.24, 995.25, 995.27; 73/114.38, 73/114.52, 114.53, 114.54; 705/35, 400
See application file for complete search history.

(56) References Cited

U.S. PATENT DOCUMENTS

| 6,484,088 B1 | 11/2002 | Reimer |
| 6,587,782 B1 | 7/2003 | Nocek et al. |
| 6,594,557 B1 | 7/2003 | Stefan et al. |
| 6,615,131 B1 | 9/2003 | Rennard et al. |
| 6,691,025 B2 | 2/2004 | Reimer |
| 6,850,837 B2 | 2/2005 | Paulauskas et al. |
| 7,181,337 B2 | 2/2007 | Kosaka |
| 7,406,448 B2 | 7/2008 | Leberknight |
| 8,135,538 B2 * | 3/2012 | Geelen et al. ................. 701/438 |
| 2001/0014863 A1 | 8/2001 | Williams, III |
| 2002/0052674 A1 | 5/2002 | Chang et al. |

(Continued)

FOREIGN PATENT DOCUMENTS

| DE | 19516649 A1 | 11/1996 |
| DE | 10009727 A1 | 9/2001 |

(Continued)

OTHER PUBLICATIONS

Mobile Marketing Today, "Have Cell Phone, Find Cheap Gas", Nov. 6, 2008, <retrieved at: http://www.mediabistro.com/mobilemarketingtoday/local_search_lbs/have_cell_phone_find_cheap_gas_99863.asp>.

(Continued)

*Primary Examiner* — Rami Khatib
(74) *Attorney, Agent, or Firm* — Capitol City TechLaw; Richard C. Irving

(57) ABSTRACT

A vehicle route guidance system is provided that may dynamically determine one or more possible destinations within a predetermined distance of a current location of a vehicle having the vehicle route guidance system. The vehicle route guidance system may determine respective routes to the one or more possible destinations and may access price information with respect to the one or more possible destinations. For each of the one or more possible destinations, the vehicle route guidance system may estimate a cost of fuel to be consumed by the vehicle to reach respective ones of the one or more possible destination based on received traffic information, a respective route, and vehicle fuel consumption information. The vehicle route guidance system may provide information for guiding the vehicle to one of the one or more possible destinations having a lowest total overall cost.

18 Claims, 6 Drawing Sheets

(56) References Cited

U.S. PATENT DOCUMENTS

| | | |
|---|---|---|
| 2003/0069684 A1 | 4/2003 | Reimer |
| 2006/0291482 A1 | 12/2006 | Evans |
| 2006/0293849 A1 | 12/2006 | Baldwin |
| 2007/0090937 A1* | 4/2007 | Stabler .................. 340/450.2 |
| 2007/0150171 A1 | 6/2007 | Tengler et al. |
| 2007/0233371 A1 | 10/2007 | Stoschek et al. |
| 2008/0133124 A1 | 6/2008 | Sarkeshik |
| 2008/0167812 A1 | 7/2008 | Geelen |
| 2008/0189033 A1* | 8/2008 | Geelen et al. ................. 701/209 |
| 2008/0228385 A1 | 9/2008 | Geelen |
| 2008/0243663 A1 | 10/2008 | Eveland |
| 2009/0109022 A1* | 4/2009 | Gangopadhyay et al. .... 340/540 |
| 2011/0029233 A1* | 2/2011 | Carpenter .................... 701/202 |
| 2011/0196601 A1* | 8/2011 | Miura et al. .................. 701/200 |
| 2012/0004838 A1* | 1/2012 | Lee et al. ..................... 701/123 |
| 2012/0179365 A1* | 7/2012 | Miyahara et al. ............. 701/428 |

FOREIGN PATENT DOCUMENTS

| | | | |
|---|---|---|---|
| DE | 10105175 | A1 | 8/2002 |
| DE | 10146789 | A1 | 4/2003 |
| JP | 2001317951 | A | 11/2001 |
| JP | 2002139334 | A | 5/2002 |
| JP | 2004125430 | A | 4/2004 |
| JP | 2005207859 | A | 8/2005 |
| JP | 2005285082 | A | 10/2005 |
| JP | 2006112338 | A | 4/2006 |
| JP | 2007255996 | A | 10/2007 |
| JP | 2008032439 | A | 2/2008 |
| JP | 2008032472 | A | 2/2008 |
| JP | 2008174344 | A | 7/2008 |

OTHER PUBLICATIONS

BlueTomorrow.com, "Telenav Bluetooth GPS Navigator", Jan. 14, 2009, <retrieved at http://www.bluetomorrow.com/content/section/404/534/>.

Truta, Filip, "iGas iPhone App Uses GPS to Show the Cheapest Oil Stations Around", Aug. 27, 2008, retrieved at <http://news.softpedia.com/news/iGas-iPhone-App-Uses-GPS-to-Show-the-Cheapest-Oil-Stations-Around-92550.shtml>.

* cited by examiner

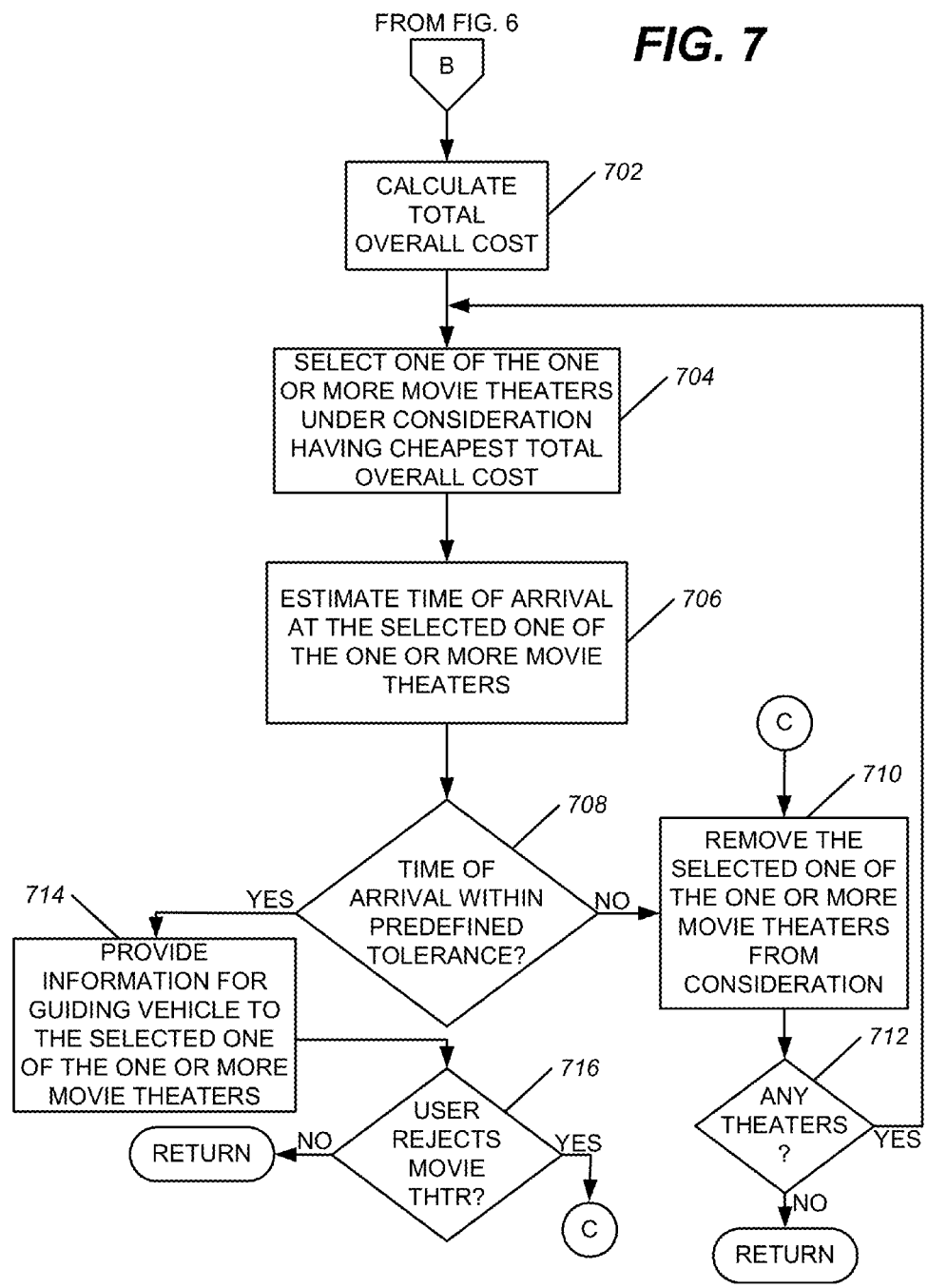

DYNAMIC ROUTE GUIDANCE

BACKGROUND

1. Field of the Invention

The present teachings relate to a method and a system for dynamically providing route guidance to a vehicle. In particular, the present teachings relate to a method and a system for dynamically providing route guidance to a vehicle for guiding the vehicle to a destination based, at least partly, on a determined driving range of the vehicle and a cost of fuel consumed to reach the destination.

2. Discussion of the Related Art

Some existing vehicle route guidance systems receive traffic information and route a vehicle to a destination, such that the route is one which has a best traffic situation from among a number of possible routes. Many existing vehicle route guidance systems may guide a vehicle to a cheapest gas station from among a group of gas stations within a given proximity of a current location of a vehicle and may guide the vehicle to a cheapest gas station within a driving range of the vehicle along a travel route. Some vehicle route guidance systems determine a cheapest gas station based on a price of gas at the gas station and a cost associated with driving the vehicle from the current location to the cheapest gas station.

Further, a number of existing vehicle route guidance systems are capable of finding a nearest movie theater playing a given movie, calculating a route to the nearest movie theater, and guiding a user to the nearest movie theater. Some of the existing vehicle route guidance systems estimate a time of arrival at movie theaters and list the movie theaters based on a cost of a ticket.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A vehicle route guidance system may provide dynamic routing guidance to a destination. The destination may include a fueling station, a movie theater showing a particular movie, or other destinations. The vehicle route guidance system may receive traffic information and may determine a route to a destination, which has a least amount of traffic from among a number of possible routes. In various embodiments, the vehicle route guidance system may provide dynamic route guidance to a destination, such as, for example, a fueling station or other destination having a lowest, or cheapest, total overall cost, within a predetermined distance of a current location of a vehicle having the vehicle route guidance system. The total overall cost, with respect to a fueling station, may include a cost of fuel at the fueling station, and an estimated cost of fuel to be consumed by the vehicle based, at least partly, on the received traffic information, when traveling from the current location to the fueling station.

In some embodiments, a user may use a vehicle route guidance system to indicate a particular movie the user wishes to see. The vehicle route guidance system may find one or more movie theaters that are showing the particular movie and are located within a predetermined distance of a current location of a vehicle having the vehicle route guidance system. The vehicle route guidance system may obtain show times for the particular movie at the one or more movie theaters and may further receive traffic information. The vehicle route guidance system may calculate respective routes to the one or more movie theaters, may predict an amount of fuel to be consumed by the vehicle when traveling to the respective one or more movie theaters, and may estimate a respective cost of the predicted amount of fuel to be consumed. The vehicle route guidance system may calculate respective total overall costs of the one or more movie theaters and may select one of the one or more movie theaters having a cheapest total overall cost. Some of the vehicle route guidance systems may estimate a time of arrival at the selected one of the one or more movie theaters. If the estimated time of arrival is within a predefined tolerance of a show time, or starting time, of the particular movie, then the vehicle route guidance system may provide information for guiding the vehicle to the selected one of the one or more movie theaters. Otherwise, the vehicle route guidance system may eliminate the one of the one or more movie theaters from consideration and may determine a next one of the one or more movie theaters having a cheapest total overall cost.

BRIEF DESCRIPTION OF THE DRAWING

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIGS. 3-7 are flowcharts illustrating exemplary processes that may be performed by various embodiments of a vehicle route guidance system.

DETAILED DESCRIPTION

Overview

Figure 1:
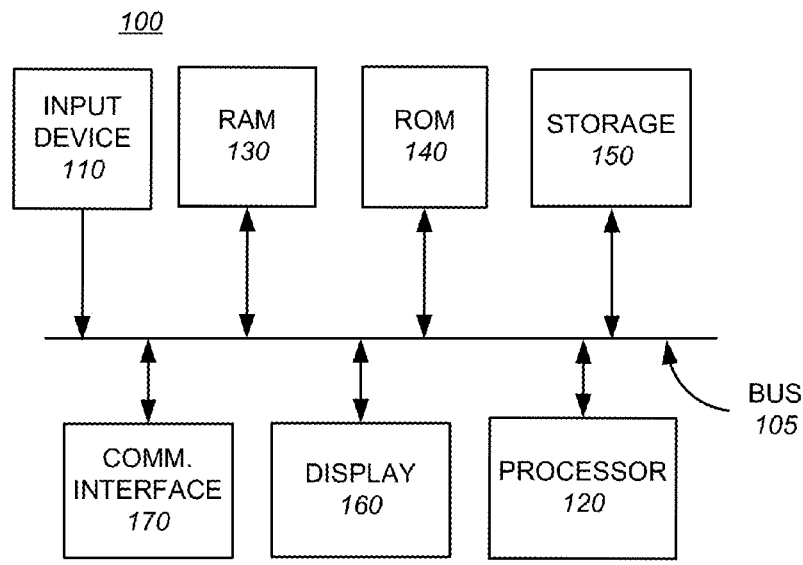
FIG. 1 is a functional block diagram of an exemplary computing device included within an embodiment of a vehicle route guidance system.

Existing vehicle route guidance systems may route a vehicle to a cheapest gas station from among a group of gas stations within a given proximity of a current location of the vehicle. However, the existing vehicle route guidance systems fail to determine a cheapest gas station, from among a number of gas stations within a driving range of the vehicle, such that the driving range is determined based on received traffic conditions and a predicted fuel consumption by the vehicle when operating according to the received traffic conditions.

Further, existing vehicle route guidance systems may find a nearest movie theater playing a given movie, calculate a route to the nearest movie theater, and guide the vehicle to the nearest movie theater. However, the existing vehicle route guidance systems do not estimate a cost of fuel to be consumed by the vehicle when traveling to a number of movie theaters within a predetermined distance of a current location of the vehicle, calculate an overall cost of seeing the given movie at each of the movie theaters based, at least in part, on a respective cost of a movie ticket and the respective estimated cost of fuel to be consumed by the vehicle when traveling to each of the movie theaters, and displaying which of the movie theaters has a lowest overall cost for seeing the given movie.

In various embodiments, a vehicle route guidance system may provide dynamic routing guidance to a destination. For example, the destination may include, but not be limited to, a fueling station that sells fuel for a vehicle or a movie theater showing a given movie. The vehicle route guidance system may receive traffic information and may determine one or more possible destinations within a predetermined distance of the current location of the vehicle. Respective routes to the one or more possible destinations within the predetermined distance of the current location of the vehicle may be determined based, at least partly, on the received traffic information. The vehicle route guidance system may access price information regarding the one or more possible destinations and may estimate respective costs of fuel to be consumed by the vehicle when traveling from the current location to the respective one or more possible destinations based, at least partly, on the received traffic information and fuel consumption information regarding the vehicle. The vehicle route guidance system may then compute, with respect to each of the one or more possible destinations, a total overall cost based on the price information and the respective estimated cost of the fuel to be consumed to reach a respective one of the one or more possible destinations. The vehicle route guidance system may select a destination having a lowest total overall cost from among the one or more possible destinations and may provide information for guiding the vehicle to the selected destination.

In some embodiments, using the vehicle route guidance system a user may select a particular movie. The vehicle route guidance system may find one or more movie theaters that show the particular movie within a predetermined distance of a current location of a vehicle. The vehicle route guidance system may obtain show times for the particular movie at the one or more movie theaters and may receive traffic information. The vehicle route guidance system may then calculate routes to the one or more movie theaters, may predict an amount of fuel to be consumed by the vehicle when traveling to respective movie theaters, and may estimate respective costs of the predicted amount of fuel to be consumed. The vehicle route guidance system may then calculate respective total overall costs of the one or more movie theaters and may select one of the one or more movie theaters having a cheapest total overall cost. A time of arrival at the selected one of the one or more movie theaters may be estimated and if the estimated time of arrival is within a predefined tolerance of a starting, or show time of the particular movie, then the vehicle route guidance system may provide information for guiding the vehicle to the selected one of the one or more movie theaters.

Exemplary Computing Device

FIG. 1 is a functional block diagram which illustrates an exemplary computing device 100, which may be included in embodiments of a vehicle route guidance system. Computing device 100 may include a bus 105, an input device 110, a processor 120, a memory, which may include a random access memory (RAM) 130 and a read only memory (ROM) 140, a storage device 150, a display 160, and a communication interface 170. Bus 105 may permit communication between processor 120 and components of computing device 100.

Processor 120 may include at least one conventional processor or microprocessor that interprets and executes instructions. RAM 130 may be a random access memory (RAM) or another type of dynamic storage device that stores information and instructions for execution by processor 120. RAM 130 may also store temporary variables or other intermediate information used during execution of instructions by processor 120. ROM 140 may include a conventional ROM device or another type of static storage device that stores static information and instructions for processor 120. Storage device 150 may include any type of computer-readable storage medium for storing data and/or instructions.

Input device 110 may include one or more conventional mechanisms that permit a user to input information to computing device 100, such as, for example, a keyboard, a touch screen, or other input device. Communication interface 170 may include any transceiver-like mechanism that enables computing device 100 to communicate with other devices or networks. In some embodiments, communication interface 170 may also include a transceiver for communicating with satellites such as, for example, Global Positioning System (GPS) satellites.

Computing device 100 may perform such functions in response to processor 120 executing sequences of instructions contained in a computer-readable storage medium, such as, for example, ROM 140, an optical storage medium, a magnetic storage medium, or other storage medium. Such instructions may be read into RAM 130 from another computer-readable storage medium, such as storage device 150, or from a separate device via communication interface 170.

Exemplary Operating Environment

Figure 2:
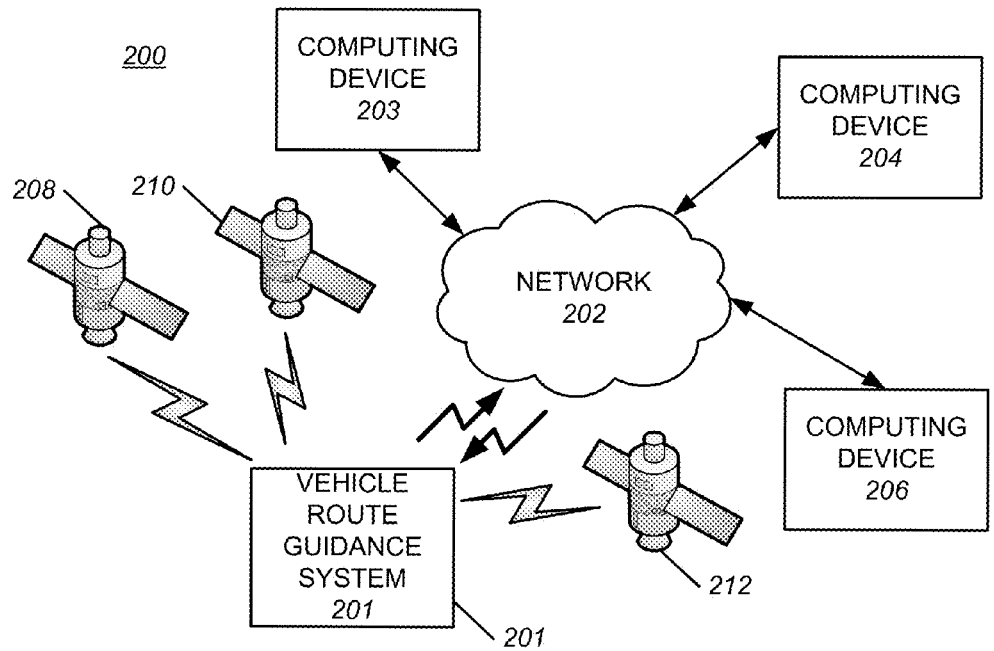
FIG. 2 illustrates an exemplary environment in which an embodiment of a vehicle route guidance system may operate.

FIG. 2 illustrates an exemplary operating environment 200 for one or more embodiments. Operating environment 200 may include a vehicle route guidance system 201 within a vehicle, which may include computing device 100. Computing device 100, of vehicle route guidance system 201, may wirelessly communicate with a network 202. Network 202 may be a single network or a network of networks including, but not limited to, the Internet. For example, network 202 may include a wireless network, a wired network, a public switched telecommunication network (PSTN), a fiber optic network, or other types of networks. Vehicle route guidance system 201 and computing devices 203, 204, 206 may be connected to network 202. At least some of computing devices 203, 204, 206 may be a server. Some of the servers may be included within a server farm.

Vehicle route guidance system 201 may communicate with satellites 208, 210, 212 to determine a current location of a vehicle. Vehicle route guidance system 201 may further communicate with other computing devices, including, but not limited to, computing devices 203, 204, 206, to obtain information. The information may include, but not be limited to, traffic information, road information, fueling station information, fuel price information, movie theater information, and movie information.

Although operating environment 200 shows three satellites 208, 210, 212 communicating with vehicle route guidance system 201, other operating environments may have a different number of satellites communicating with a vehicle route guidance system. Similarly, operating environment 200 shows three computing devices 203, 204, 206 connected to network 202. However, other operating environments may have fewer or more computing devices connected to a network. Further, in other embodiments, vehicle route guidance system 201 may not communicate with any satellites, but instead, may determine a current location by other methods.

Exemplary Operation

Figure 3:
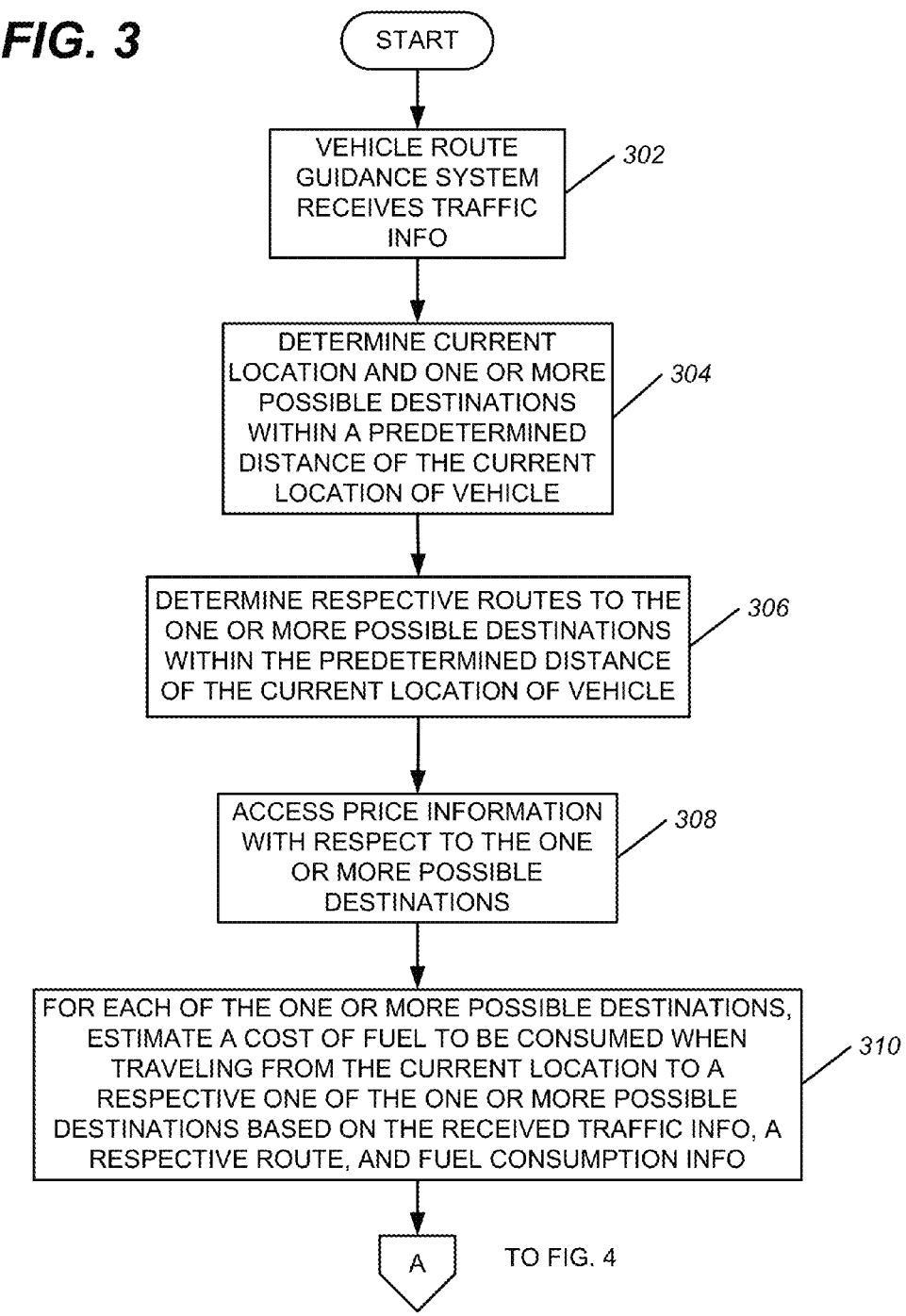

FIG. 3 is a flowchart illustrating exemplary operation of a vehicle route guidance system in various embodiments. The process may begin with vehicle route guidance system 201 receiving traffic information (act 302). In some embodiments, the traffic information may be received via a network from one or more other computing devices. In other embodiments, the traffic information may be received via satellite communications, radio communications, or via another method.

Vehicle route guidance system 201 may then determine a current location of a vehicle, one or more possible destinations within a predetermined distance of the current location of the vehicle including vehicle route guidance system 201 (act 304) and respective routes to the one or more possible destinations (act 306). The one or more possible destinations may include, but not be limited to, a fueling station or a movie theater. In some embodiments, vehicle route guidance system 201 may take the received traffic information into consideration when determining respective routes, such that a respective route determined for a corresponding possible destination may have a best traffic situation.

In some embodiments, a user may set the predetermined distance to one mile, five miles, or another distance. In other embodiments, the predetermined distance may be set based on an estimated driving range of the vehicle. For example, in some embodiments, the predetermined distance may be set to a percentage of the estimated driving range of the vehicle, such as, for example, 90%, 95%, or another percentage. Vehicle route guidance system 201 may estimate the driving range of the vehicle based, at least partly, on fuel consumption information of the vehicle as well as the received traffic information. For example, if most of the determined route to a possible destination is over a highway, the fuel consumption information of the vehicle indicates that the vehicle consumes 1 gallon of fuel for 30 miles traveled, and the vehicle currently has one gallon of fuel remaining, then the estimated driving range of the vehicle may be 30 miles. However, if the received traffic information indicates that the traffic is stop and go for at least a portion of the route, the vehicle may be estimated to consume more fuel to reach the possible destination, such as, for example, 1 gallon of fuel for 20 miles traveled. In this situation, the estimated driving range of the vehicle may be 20 miles.

In some embodiments, if vehicle routing system 201 is currently guiding the vehicle to a trip destination, during act 304 vehicle route guidance system 201 may determine one or more possible destinations within a predetermined distance of a current calculated route to the trip destination.

Next, vehicle route guidance system 201 may access price information with respect to the one or more possible destinations (act 308). For example, if the one or more possible destinations include fueling stations, the price information may include a price of fuel for the vehicle at each of the fueling stations. Similarly, if the one or more possible destinations include movie theaters showing a particular movie, the price information may include a ticket price for the particular movie at each of the movie theaters.

Figure 4:
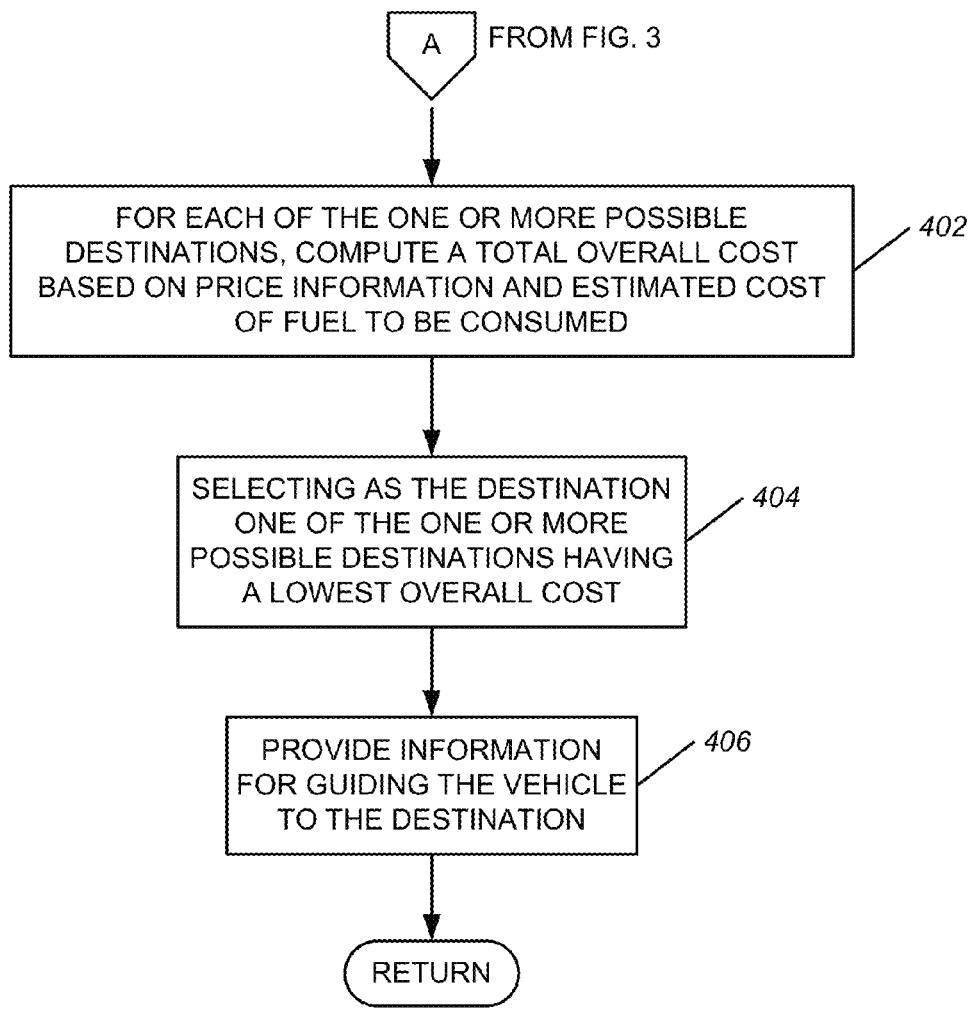

Vehicle route guidance system 201 may estimate a cost of fuel to be consumed by the vehicle when traveling from a current location to respective ones of the one or more possible destinations based, at least partly, on the received traffic information, the respective route, estimated fuel consumption, and the price information (act 310). For each of the one or more possible destinations, vehicle route guidance system 201 may compute a respective total overall cost based on corresponding price information and the corresponding estimated cost of fuel to be consumed by the vehicle while traveling from the current location to the respective one or more possible destinations (act 402; FIG. 4). Vehicle route guidance system 201 may then select, as a destination, one of the one or more possible destinations having a lowest total overall cost (act 404). Vehicle route guidance system 201 may then present information regarding the selected destination and may provide information for guiding the vehicle to the selected destination (act 406).

Figure 5:
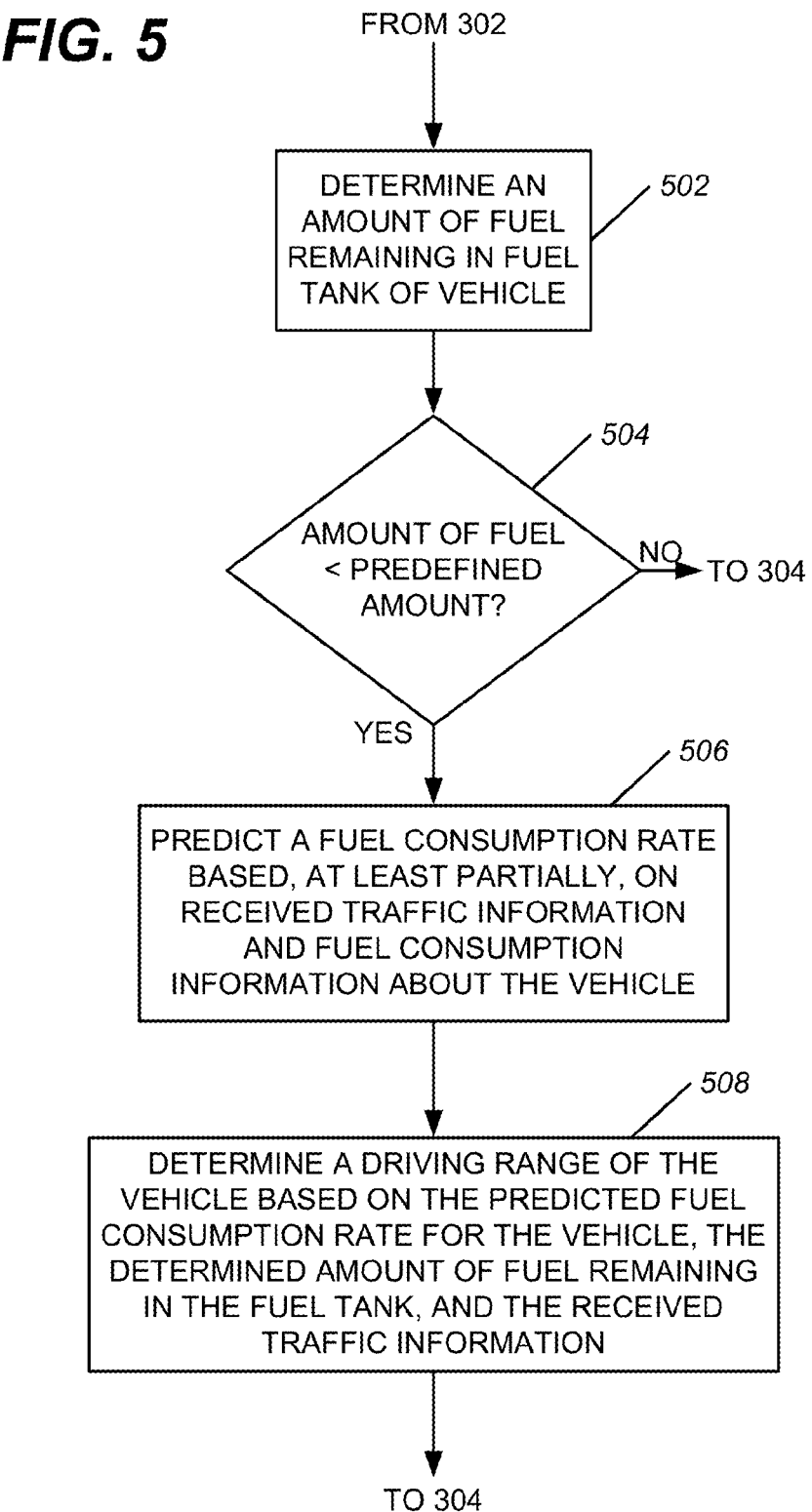

FIG. 5 is a flowchart illustrating a variation of the process described in FIGS. 3 and 4, which may be implemented in various embodiments. In this variation, the one or more possible destinations to be determined may be one or more fueling stations. The process may be a continuation from act 302 of FIG. 3 and vehicle route guidance system 201 may determine an amount of fuel remaining in a fuel tank of the vehicle (act 502). If the amount of fuel remaining in the fuel tank is not less than a predefined amount, then the process may continue at act 304 (FIG. 3). Otherwise, vehicle route guidance system 201 may predict a fuel consumption rate of the vehicle based, at least partially, on the received traffic information and fuel consumption information regarding the vehicle (act 506). Vehicle route guidance system 201 may determine the driving range of the vehicle based on the predicted fuel consumption rate of the vehicle, the determined amount of fuel remaining in the fuel tank, and the received traffic information (act 508). The process may then continue at act 304 (FIG. 3) in which one or more possible destinations within a predetermined distance of a current location of the vehicle may be determined. In this variation of an embodiment, the predetermined distance may be equal to the determined driving range of the vehicle or a percentage of the determined driving range of the vehicle, as mentioned previously. The process may then continue from act 304 through act 406 as previously discussed with respect to FIGS. 3 and 4.

Figure 6:
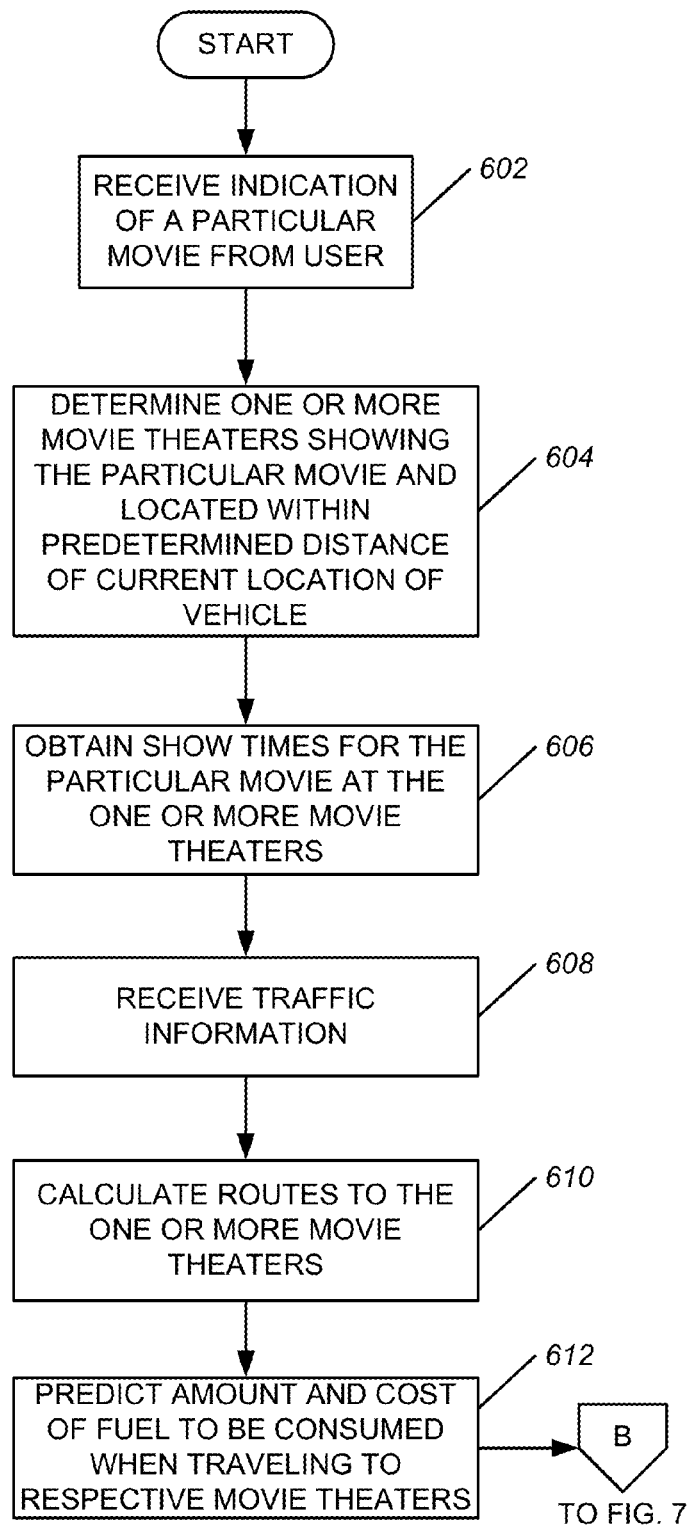

FIGS. 6 and 7 are flowcharts illustrating an exemplary process in an embodiment in which vehicle route guidance system 201 may permit a user to select a particular movie and may dynamically provide guidance to the user for driving to a movie theater showing the particular movie. The process may begin with vehicle route guidance system 201 receiving an indication of a particular movie from a user (act 602). In some embodiments, vehicle route guidance system 201 may access movie information from one or more computing devices via a network and may present a list of movies to a user via display 160. The user may select one of the listed movies via any of a number of methods including, but not limited to, touching a portion of a touch screen in which a name of a desired movie is displayed, depressing a button or touching a soft control on display 160, moving a point of focus to a name of a desired movie on display 160, speaking a name of a desired movie, or via other methods.

Vehicle route guidance system 201 may then determine one or more movie theaters, located within a predetermined distance of a current location of the vehicle, that show the particular movie (act 604). Vehicle route guidance system 201 may then obtain show times for the particular movie at the one or more movie theaters (act 606). In some embodiments, vehicle route guidance system 201 may obtain the show times via the network and one or more computing devices having access to movie theater data, which may include names of movies playing at particular movie theaters and corresponding show times.

Vehicle route guidance system 201 may receive traffic information via the network or via another source (act 608) and may calculate respective routes to the one or more movie theaters (act 610). Vehicle route guidance system 201 may consider the received traffic information when calculating the respective routes, such that the respective routes are routes, having a best traffic situation from among considered routes, from a current location of the vehicle to the respective ones of the one or more movie theaters.

Vehicle route guidance system 201 may predict an amount and a cost of fuel to be consumed by the vehicle when traveling to each of the respective movie theaters from the current location of the vehicle (act 612). Vehicle route guidance system 201 may predict the amount of fuel to be consumed for each of the respective calculated routes based, at least partly, on the received traffic information and the respective calculated route. In some embodiments, vehicle route guidance system 201 may access other information including, but not limited to, speed limit information of roads along the respective calculated routes, such that the predicted amount of fuel to be consumed by the vehicle is further based, at least partially, on the speed limit information.

Vehicle route guidance system 201 may then calculate a respective total overall cost of seeing the particular movie at each of the one or more movie theaters (act 702; FIG. 7). In various embodiments, the total overall cost, with respect to each of the respective one or more movie theaters may include a cost of a movie ticket to see the particular movie at a respective one of the one or more movie theaters and a cost of the predicted amount of fuel to be consumed when traveling to the respective one of the one or more movie theaters.

Vehicle route guidance system 201 may then select one of the one or more movie theaters under consideration that has a cheapest total overall cost (act 704). Thus, for example, if a ticket for seeing the particular movie at movie theater A is $5, a cost of a predicted amount of fuel to be consumed by the vehicle when traveling to the movie theater A is $3, a ticket for seeing the particular movie at movie theater B is $6, and a cost of a predicted amount of fuel to be consumed by the vehicle when traveling to the movie theater B is $1.50, then vehicle route guidance system 201 may select movie theater B as a movie theater having a cheapest total overall cost ($7.50). A total overall cost with respect to movie theater A is $8 in this example.

In some embodiments, vehicle route guidance system 201 may permit a user to enter a number of movie tickets the user plans to purchase. In such embodiments, vehicle route guidance system 201 may consider the cost of the number of tickets the user plans to purchase when calculating a total overall cost with respect to each of the one or more movie theaters. Using the example above, when purchasing two movie tickets, a total overall cost with respect to movie theater B is $13.50 and a total overall cost with respect to movie theater A is $13. In this example, vehicle route guidance system 201 may then select movie theater A.

After performing act 704, vehicle route guidance system 201 may estimate a time of arrival at the selected one of the one or more movie theaters (act 706). Vehicle route guidance system 201 may then determine whether the estimated time of arrival is within a predefined tolerance of a starting time of the particular movie at the selected one of the one or more movie theaters (act 708). For example, the predefined tolerance may be set such that the estimated time of arrival is within 15 minutes, 30 minutes, or another number of time units before the starting time of the particular movie.

If vehicle route guidance system 201 determines that the estimated time of arrival is not within the predefined tolerance, then the selected one of the one or more movie theaters is removed from consideration (act 710) and a determination is made regarding whether any of the one or more movie theaters remain to be considered (act 712). If no movie theaters remain to be considered, then vehicle route guidance 201 may indicate that no movie theaters were found and the process may be completed. Otherwise, vehicle route guidance system 201 may repeat acts 704-708 with respect to the one or more movie theaters under consideration.

If, during act 708, vehicle route guidance system 201 determines that the estimated time of arrival is within the predefined tolerance, then vehicle route guidance system 201 may present an indication of the selected one of the one or more movie theaters and may provide information for guiding the vehicle to the selected one of the one or more movie theaters (act 714). If the user provides an indication that the selected one of the one or more movie theaters is rejected, then act 710 may be performed to remove the selected one of the one or more movie theaters from consideration and another one of the one or more movie theaters may be selected (act 704), as previously discussed.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they are not to be construed as limiting the claims in any way. Other configurations of the described embodiments are part of the scope of this disclosure. Accordingly, the appended claims and their legal equivalents define the invention, rather than any specific examples given.

I claim:

1. A machine-implemented method for providing dynamic routing guidance for guiding a vehicle to a fueling station selling fuel for the vehicle, the machine-implemented method comprising:

receiving, by a vehicle route guidance system within the vehicle, traffic information;

determining, by the vehicle route guidance system, at least one fueling station within a first predetermined distance of a current location of the vehicle;

determining, by the vehicle route guidance system, a respective route to each of the at least one fueling station from the current location of the vehicle;

accessing, by the vehicle route guidance system, price information associated with each of the at least one fueling station;

estimating, by the vehicle route guidance system, a cost of fuel to be consumed by the vehicle in order to travel from the current location to each of the at least one fueling station based, at least partially, on the received traffic information, the determined respective route, and fuel consumption information;

computing, by the vehicle route guidance system, a total overall cost with respect to each of the at least one fueling station based on the accessed price information and the estimated cost of fuel to be consumed by the vehicle in order to travel from the current location to each of the at least one fueling station;

selecting, by the vehicle route guidance system, one of the at least one fueling station having a lowest total overall cost as the destination;

providing, by the vehicle route guidance system, first information for guiding the vehicle to the destination;

receiving, by the vehicle route guidance system from a user, second information indicating a particular movie;

determining at least one movie theater showing the particular movie in an area within a second predetermined distance of the current location of the vehicle;

predicting respective costs of fuel to be consumed by the vehicle when traveling from the current location of the vehicle to respective locations of each of the at least one movie theater;

estimating a total cost associated with each of the at least one movie theater, respective estimated total costs include a cost of a ticket at a respective one of the at least one movie theater and the respective cost of fuel predicted to be consumed by the vehicle when traveling to the respective one of the at least one movie theater;

determining one of the at least one movie theater under consideration as a cheapest movie theater based on the estimated total cost associated with each of the at least one movie theater; and providing information for guiding the vehicle to the cheapest movie theater.

2. The machine-implemented method of claim 1, wherein:
the estimating a cost of fuel to be consumed by the vehicle further comprises:
predicting, by the vehicle route guidance system, a fuel consumption rate of the vehicle based, at least partially, on the received traffic information; and
the machine-implemented method further comprises:
determining, by the vehicle route guidance system, an amount of fuel remaining in a fuel tank of the vehicle, and
determining, by the vehicle route guidance system, a driving range of the vehicle based on the predicted fuel consumption rate of the vehicle, the determined amount of fuel remaining in the fuel tank of the vehicle, and the received traffic information, the first predetermined distance being based on the determined driving range.

3. The machine-implemented method of claim 2, wherein the first predetermined distance is equal to a given percentage of the determined driving range.

4. The machine-implemented method of claim 2, wherein each of the at least one fueling station is located within a predetermined distance of a calculated route to a trip destination.

5. The machine-implemented method of claim 1, comprising:
obtaining, by the vehicle route guidance system, show times for the particular movie at the cheapest movie theater;
estimating, by the vehicle route guidance system, an arrival time at the cheapest movie theater;
determining, by the vehicle route guidance system, whether the estimated arrival time at the cheapest movie theater is within a predefined tolerance of a show time of the particular movie; and
performing, by the vehicle route guidance system, the providing of the information for guiding the vehicle to the cheapest movie theater when the estimated arrival time is determined to be within the predefined tolerance of the show time.

6. The machine-implemented method of claim 5, further comprising:
when the estimated arrival time is determined not to be within the predefined tolerance of the show time, performing:
discarding the cheapest movie theater;
selecting, by the vehicle route guidance system, a next cheapest movie theater as having a lowest overall cost from among the at least one cheapest movie theater, excluding the discarded cheapest movie theater, as a current cheapest movie theater;
estimating, by the vehicle route guidance system, an arrival time at the current cheapest movie theater;
determining, by the vehicle route guidance system, whether the estimated arrival time at the current cheapest movie theater is within the predefined tolerance of a show time of the particular movie; and
providing information for guiding the vehicle to the current cheapest movie theater when the estimated arrival time is determined to be within the predefined tolerance of the show time.

7. The machine-implemented method of claim 5, wherein the estimating an arrival time at the cheapest movie theater further comprises:
estimating the arrival time at the cheapest movie theater based, at least partially, on the received traffic information.

8. A system for providing dynamic routing guidance to a fueling station, the system comprising:
at least one computing device, one of the at least one computing device being located within a vehicle;
at least one memory connected to at least one processor of the at least one computing device, the at least one memory comprising:
instructions for determining an amount of fuel remaining in a fuel tank of a vehicle,
instructions for receiving and storing traffic information,
instructions for predicting a fuel consumption rate for the vehicle based, at least partially, on the received and stored traffic information and fuel consumption information for the vehicle,
instructions for accessing, by the computing device, price information for fuel at a plurality of fueling stations within a first predetermined distance of a current location of the vehicle,
instructions for predicting, by the computing device, respective amounts of fuel consumed to reach respective ones of the plurality of fueling stations based, at least partially, on the predicted fuel consumption rate for the vehicle,
instructions for estimating a respective estimated cost of fuel to reach the respective ones of the plurality of fuel stations based on the predicted respective amounts of fuel consumed to reach the ones of the plurality of fueling stations,
instructions for computing a cheapest overall price with respect to fueling the vehicle at each of the plurality of fueling stations based on the price information for the fuel at the plurality of fueling stations and the respective estimated cost of the fuel to reach the plurality of fueling stations,
instructions for outputting information regarding one of the plurality of fueling stations having the cheapest overall price,
instructions for receiving information indicating a particular movie, instructions for determining at least one movie theater showing the particular movie in an area within a second predetermined distance of the current location of the vehicle,
instructions for predicting respective costs of fuel to be consumed by the vehicle when traveling from the current location of the vehicle to respective locations of each of the at least one movie theater,
instructions for estimating a total cost associated with each of the at least one movie theater, respective estimated total costs include a cost of a ticket at a respective one of the at least one movie theater and the respective cost of fuel predicted to be consumed by the vehicle when traveling to the respective one of the at least one movie theater,
instructions for determining one of the at least one movie theater under consideration as a cheapest movie theater based on the estimated total cost associated with each of the at least one movie theater; and
instructions for providing information for guiding the vehicle to the cheapest movie theater.

9. The system of claim 8, wherein the at least one memory further comprises:
instructions for determining a driving range of the vehicle based on the predicted fuel consumption rate for the vehicle and the received and stored traffic information, wherein
the first predetermined distance is based on the determined driving range.

10. The system of claim 8, wherein the at least one memory further comprises:
instructions for determining the current location of the vehicle.

11. The system of claim 10, wherein each of the plurality of fueling stations is located within a second predetermined distance of a calculated route to a trip destination.

12. The system of claim 8, wherein the at least one memory further comprises:
instructions for obtaining a show time for the cheapest movie theater,
instructions for estimating a time of arrival of the vehicle at the cheapest movie theater,
instructions for determining whether the estimated time of arrival is within a predefined tolerance of the show time at the cheapest movie theater, and
instructions for eliminating the cheapest movie theater from consideration and determining one of the at least one movie theater under consideration as a cheapest movie theater based on the estimated total cost associated with each of the at least one movie theater under consideration when the estimated time of arrival is determined not to be within the predefined tolerance of the show time.

13. A system for providing dynamic routing guidance to a fueling station, the system comprising:
at least one computing device, one of the at least one computing device being located within a vehicle;
at least one memory connected to at least one processor of the at least one computing device, the at least one memory having instructions stored therein for performing a method comprising:
determining, by the vehicle route guidance system, a respective route from a current location of the vehicle to each of at least one fueling station within a first predetermined distance of the current location of the vehicle,
accessing, by the vehicle route guidance system, price information associated with each of the at least one fueling station,
estimating, by the vehicle route guidance system, a cost of fuel to be consumed by the vehicle in order to travel from the current location to each of the at least one fueling station based, at least partially, on the determined respective route, and fuel consumption information of the vehicle,
computing, by the vehicle route guidance system, a total overall cost with respect to each of the at least one fueling station based on the accessed price information and the estimated cost of fuel to be consumed by the vehicle in order to travel from the current location to each of the at least fueling station,
selecting, by the vehicle route guidance system, one of the at least one fueling station having a lowest total overall cost as a selected fueling station,
providing, by the vehicle route guidance system, first information for guiding the vehicle to the selected fueling station,
accessing information regarding at least one movie theater showing a particular movie within a predefined distance of the current location of the vehicle,
calculating a route to each of the at least one movie theater from the current location of the vehicle,
predicting a cost of fuel to be consumed by the vehicle in order to reach each of the at least one movie theater from the current location based on the respective calculated routes, the fuel consumption information of the vehicle, and fuel price information,
computing a total overall cost, with respect to each of the at least one movie theater, based on a ticket price of the particular movie at each of the at least one movie theater and the predicted cost of fuel to be consumed by the vehicle in order to reach each of the at least one movie theater,
determining a cheapest movie theater showing the particular movie, from among the at least one movie theater within the predefined distance, based on the respective total overall costs with respect to each of the at least one movie theater, and
providing information for guiding the vehicle to the cheapest movie theater from the current location of the vehicle.

14. The system of claim 13, wherein the predicting a cost of fuel to be consumed by the vehicle in order to reach each of the at least one movie theater is further based, at least partially, on received traffic information.

15. The system of claim 13, wherein the method further comprises:
estimating an amount of time to reach the cheapest movie theater from the current location of the vehicle,
estimating an arrival time with respect to the cheapest movie theater based on a current time and the estimated amount of time to reach the cheapest movie theater, and
determining a next cheapest movie theater from among the at least one movie theater when the estimated arrival time is not within a predefined tolerance of a movie starting time.

16. The system of claim 13, wherein the method further comprises:
determining a next cheapest movie theater from among the at least one movie theater after an indication is received from a user indicating a desire not to go to the determined cheapest movie theater.

17. The system of claim 13, wherein the method further comprises:
   computing a route from the current location of the vehicle to a given destination,
   determining an amount of fuel remaining in a fuel tank of the vehicle,
   automatically performing, when the determined amount of fuel in the fuel tank is less than a predefined amount:
      accessing second fuel price information for a second plurality of fueling stations along or within a predetermined distance of the computed route,
      predicting a fuel consumption rate for the vehicle based, at least partially, on speed limit information along the computed route,
      determining a driving range of the vehicle based on the predicted fuel consumption rate for the vehicle and the determined amount of fuel remaining in the fuel tank,
      determining, based on the accessed fuel price information, at least one of the second plurality of fuel stations having a cheapest fuel price and being located within the determined driving range of the vehicle, and
      presenting information regarding the at least one of the second plurality of fuel stations having a cheapest fuel price and being located within the determined driving range of the vehicle.

18. The system of claim 13, wherein the method further comprises:
   receiving and storing traffic information, wherein:
      the computing a route from a current location of the vehicle to a given destination further comprises computing a route from the current location of the vehicle to the given destination based, at least partially, on the received and stored traffic information, and
      the predicting a fuel consumption rate for the vehicle based, at least partially, on speed limit information of the computed route further comprises predicting the fuel consumption rate for the vehicle based, at least partially, on the received and stored traffic information.

* * * * *